May 2, 1961           C. F. HISKEY           2,982,609
PROCESS FOR THE REMOVAL OF TIN OXIDE FROM MINERALS
Filed Dec. 23, 1957
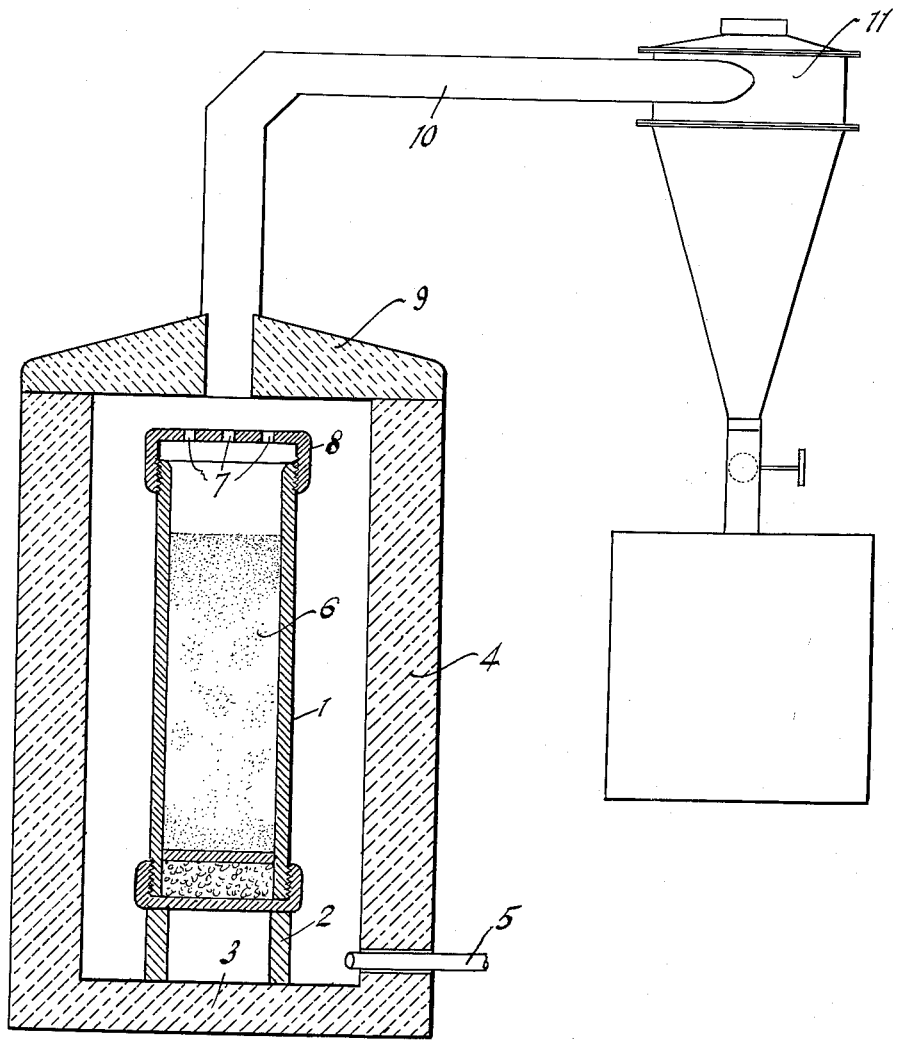
INVENTOR.
Clarence F. Hiskey
BY J.B. Felshin
ATTORNEY

United States Patent Office 2,982,609
Patented May 2, 1961

2,982,609
PROCESS FOR THE REMOVAL OF TIN OXIDE FROM MINERALS

Clarence F. Hiskey, Wallkill, N.Y., assignor to Transition Metals & Chemicals, Inc., Wallkill, N.Y., a corporation of Delaware Filed Dec. 23, 1957, Ser. No. 704,680

7 Claims. (Cl. 23—98)

This invention relates to the separation of tin from ores carrying it, and is herein disclosed in some detail as embodied in a process for removing selectively tin from columbium ores which carry it, and in a process for recovering tin values from cassiterite.

Columbite ore is widely used for the production of ferro-columbium, one of the master alloys used in the stainless steel industry, but the ore commonly used carries tin in the form of stannic oxide. This stannic oxide tends to persist in the ore so that when the ore is reduced directly the finished alloy carries the tin which is highly objectionable and has to be eliminated at some stage of the manufacturing process. That elimination is troublesome and expensive.

According to the present invention the tin is removed from the ore by a simple procedure using cheap and widely available materials. This procedure involves removing the tin as a volatile chloride in the presence of a reducing agent such as carbon monoxide.

Columbite ore commonly used carries about 65% columbium pentoxide, 5% tantalum pentoxide, 2 to 3% titanium dioxide, 18% to 20% ferrous oxide, 1% manganous oxide, and between 1% and 5% stannic oxide.

In the form of the invention described below in some detail, the ore was ground or comminuted to a particle size of at least 1/10 inch and treated at a temperature of about 700° to 750° C. with a mixture of about equal parts of carbon monoxide and hydrogen chloride gases, passing the gases through the ore bed.

At lower temperatures down to about 600° C. the process works more slowly though commercially. Temperatures above 750° C. are also usable, but above about 1200° C. difficulties with apparatus arise in operating the process.

This in the course of about two hours volatilizes the tin as its chloride, leaving the ore substantially free from stannic oxide.

To effect this removal of the stannic material it seemed essential that the volume of gases be commercially five times the theoretical stoichiometric requirements to carry off all the stannic oxide.

It has proved advantageous in practice to generate the gases in situ by incorporating suitable carbonaceous and comminuted chlorine-bearing materials with the charge of ground ore.

When colloidal carbon is mixed with the ore and thus heated, it is found that the adsorbed air on the carbon plus the oxygen released from the ore usually yield adequate carbon monoxide.

The carbon added may be in any of many forms, such as sugar, gums, dextrine, pitch or tar.

The hydrogen chloride gas at those temperatures reacts with the tin and forms a volatile tin chloride which finally leaves the furnace as a white smoke which may be chilled and then collected as on a separate relatively cold plate.

A convenient material for producing the hydrogen chloride gas in situ is an admixture of a hydrolyzable chloride salt, such as hydrated calcium chloride, or hydrated magnesium chloride or a hydrated ferrous or ferric chloride. These and other water-bearing salts, at these temperatures, are decomposed yielding hydrogen chloride vapor and the oxide of the metal of the salt.

In general, stannic oxide is removed from the finely divided columbium ore by mixing the finely divided carbonaceous material and the finely divided hydrolyzable chloride and heating in a suitable retort or bomb in the absence of added air for at least two hours at 700° C. to 750° C. or until evolution of tin fumes ceases.

The proportions of hydrolyzable salt and carbonaceous material present may vary widely, provided adequate minimums are present to react with the ore mixtures.

For ores like the ore described above, it has been found needful to have present at least one pound of magnesium chloride hydrate ($MgCl_2 \cdot 5H_2O$) per sixteen pounds of the ore, and one pound of carbon per thirty-two pounds of the ore. An excess of either of the salt or carbon seems harmless although wasteful.

The magnesium chloride hydrate seems to react quantitatively somewhat as follows:

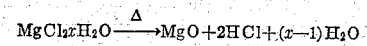

At the temperatures named apparently

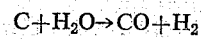

Some hydrolyzable metallic chlorides react differently under the described conditions and when such chlorides are used in the process, the proportions of them must be varied to yield the proper amount of hydrogen chloride gas.

Some of the hydrous chlorine-bearing salts that seem useful under some conditions to replace the magnesium salt are: Calcium chloride hydrate, ferrous chloride hydrate, ferric chloride hydrate, zinc chloride hydrate, strontinum chloride hydrate, barium chloride hydrate, aluminum chloride hydrate, rare earth chloride hydrates, manganese chloride hydrate, nickelous chloride hydrate, cobaltous chloride hydrate, cuprous chloride hydrate, cupric chloride hydrate.

This process of removing tin from its ores is suitable for releasing the tin from many mixtures and compounds carrying oxide tin, and has been successfully applied to recovering the tin from rich ores such as cassiterite and ainalite ores by volatilizing the tin as a chloride and condensing the resulting tin oxide produced when the chloride is burned in the hot gases issuing from the crucible.

In treating the ores carrying more than the 3 to 5% of tin common in the columbite minerals, the salt yielding the hydrogen chloride gas and the carbon were both increased and the period of heating was increased to three or four hours, or for half an hour after the vapors showed no apparent presence of volatilized tin.

The accompanying drawing shows diagrammatically in section, a suitable apparatus in which to carry out the process described in the example below, including the recovery of the tin oxide, if desired, as in the recovery of tin values from cassiterite.

In that figure an iron or stainless steel crucible 1 is shown mounted on a pedestal 2 holding it above the floor 3 within the furnace formed by the surrounding refractory walls 4.

Heat is shown as coming from a pipe 5 passing through the wall 4 to project an oil or gas flame which heats the crucible 1.

The crucible 1 is shown as filled to three-fourths of its height with a charge 6 of comminuted ore mixed with carbon such as channel black, amorphous carbon, charcoal or graphite, and with a suitable hydrous chloride such as hydrous chloride of magnesium.

When the charged crucible is heated to at least 600° C., and not over 1200° C., reducing gas and hydrogen chloride are formed, apparently converting the tin present to the volatile chloride either directly or through momentary reduction of the tin oxide present.

The tin chloride passes off through vent holes 7 in a removable cover 8 of the crucible, and may burn there to tin oxide.

The tin may be recovered by providing the furnace 1 with a removable refractory cover 9 open to a conduit 10 which conducts the volatilized tin chloride and products of combustion to a dust collector 11 shown as a cyclone separator or Cottrell dust collector, where the chilled tin oxide or chloride drops into a receiver which may be a usual form of bag (not shown).

The reactions of the tin removing process appeared to be highly selective in reacting with the tin. Repeated testing of volatile vapors coming off the crucible failed to indicate any loss of columbium or tantalum values from the reacting mix.

EXAMPLE 51 lbs. of a columbite ore were mixed with 4.25 lbs. of magnesium chloride, $MgCl_2 \cdot 1.5H_2O$ and 4.25 lbs. of carbon to give a total charge weight of 59.60 lbs. The carbon was a nearly ash-free channel black. The $MgCl_2 \cdot 1.5H_2O$ was prepared by drying magnesium chloride hexahydrate at 160° C. to nearly constant weight. The composition was established by chemical assay to be $MgCl_2 \cdot 0.155MgO \cdot 1.81H_2O$. After blending these constituents, the charge was placed in an iron bomb. This bomb was made by taking an 8" I.D. threaded black iron nipple, capped at each end with regular 8" black iron caps. The upper iron cap of the bomb had four ¼" vent holes drilled into it. The 59.60 lbs. of charge was poured into this bomb and then put into a general-purpose, gas-fired crucible furnace where it was heated rapidly to 750° C. The heating time to come to temperature was approximately one hour. As the bomb and contents became hot, one could see the tin volatilizing from it. This was evident by the characteristic bluish-green spectra of the tin flame and also by the fact that as the tin chloride volatilized from the bomb, it was burned in the hot gases of crucible furnace back to tin oxide which went off as a white smoke. Heating was continued for a total of four and a half hours. However, at the end of four hours, the volatilization of the tin had ceased completely. The extra half hour of heating was done as a precautionary measure. After cooling, the bomb was opened and the contents poured from it. The charge now weighed 52.5 lbs. indicating a loss of 7.1 lbs. in terms of volatile constituents.

On assay, it was established that the tin content of the ore was extremely low. Sampling from top to bottom showed no segregation tendencies in any section of the charge. The charge, after removal from the bomb, was roasted with an oxidizing atmosphere to burn off the carbon content, after which the ore was reduced in the customary fashion.

To illustrate the effect of this particular treatment, analyses made of the original ore, of the alloy made from the original ore, and finally of the alloy made from the de-tinned ore are summarized in Table I. It will be observed that the de-tinned ore gives a very low tin assay as compared with the high value of 2.63% in the alloy made from the original ore.

*Table I*

| Analyses of— | | | | | |
|---|---|---|---|---|---|
| Original Ore | | Alloy Made From Original Ore | | Alloy Made From De-tinned Ore | |
| $Nb_2O_5$ | 68.01 | Nb | 61.83 | Nb | 61.67 |
| $Ta_2O_5$ | 5.65 | Ta | 3.26 | Ta | 3.46 |
| $TiO_2$ | 2.47 | Ti | 0.15 | Ti | 0.16 |
| MnO | 1.71 | Mn | 0.54 | Mn | 0.53 |
| FeO | 17.50 | Fe | 29.64 | Fe | 29.50 |
| $SnO_2$ | 2.64 | Sn | 2.63 | Sn | 0.03 |
| | | Al | 0.51 | Al | 0.64 |
| | | | | C | 0.005 |

Apparently the reactions involved are somewhat as follows:

$$MgCl_2 \cdot xH_2O \rightarrow MgO + 2HCl + (x-1)H_2O$$

$$C + H_2O \rightarrow CO + H_2$$

$$SnO_2 + H_2 \xrightarrow{CO, \text{ or}} SnO \text{ or } Sn \text{ or both}$$

$$Sn \text{ or } SnO + HCl \rightarrow SnCl_2$$

and perhaps some $SnCl_4$.

The foregoing reactions seem to take place best at about 700° C. Below the temperature 600° C., mentioned above, the reactions of the mixed charge are too slow to be commercially practicable. Above 1200° C. the crucible is usually attacked to such an extent that higher temperatures are inadvisable.

The presence of reclaimable metals other than tin is not essential. Thus, in the ordinary tin ore, cassiterite, in which the only value is tin oxide, at 700° C. to 750° C., probably $$SnO_2 + H_2, \text{ or} \xrightarrow{CO, \text{ or}} SnO \text{ or } Sn \text{ or both}$$

$$Sn \text{ or } SnO + HCl \rightarrow SnCl_2$$

principally and perhaps some $SnCl_4$. It is known that some $SnCl_4$ is obtained.

Any tin oxide and tin chloride thus produced are separated from the other gases and vapors in the dust collector 11 and are thus recovered.

Having thus described certain embodiments of the invention in some detail, what is claimed is:

1. The process of separating tin oxide from ore containing less than 5% of tin oxide which comprises placing in a retort, said ore, a hydrolyzable metal chloride hydrate, and a carbonaceous material, and heating the retort to a temperature of 600° C. to 1200° C., and allowing the resulting tin chloride to volatilize and escape.

2. A process according to claim 1 in which the metal chloride is magnesium chloride hydrate, and the carbon is elemental carbon.

3. A process according to claim 1 in which the ore carrying tin oxide is columbite.

4. A process according to claim 1 in which the tin oxide in the ore is selected from the group consisting of ainalite and cassiterite, and the escaping tin chloride is burned to tin oxide and separately collected at a dust collector.

5. A process of treating columbite ore containing less than 5% tin oxide comprising treating a mixture of the ore with hydrated magnesium chloride and a carbonaceous material at a temperature of 650° C. to 850° C.

6. A process of treating cassiterite ore containing less than 5% tin oxide comprising treating a mixture of the ore with hydrated magnesium chloride and a carbonaceous material, at a temperature of 700° to 750° C.

7. A process for removing tin oxide from ore containing less than five percent of tin oxide, comprising heating, in absence of added oxygen, in a retort to a temperature of 600° C. to 1200° C., of said ore together with a metal chloride hydrate selected from a group consisting of magnesium chloride hydrate, calcium chloride hydrate, ferrous chloride hydrate, ferric chloride hydrate, zinc chloride hydrate, strontium chloride hydrate, barium chloride hydrate, aluminum chloride hydrate, rare earth chloride hydrate, manganese chloride hydrate, nickelous chloride hydrate, cobaltous chloride hydrate, cuprous chloride hydrate, cupric chloride hydrate; and a carbon bearing material selected from a group consisting of elemental carbon and a material which will pyrolyze to elemental carbon, upon heating said mixture.

References Cited in the file of this patent

UNITED STATES PATENTS

| | | |
|---|---|---|
| 2,345,210 | Muskat | Mar. 28, 1944 |

FOREIGN PATENTS

| | | |
|---|---|---|
| 8,611 of 1914 | Great Britain | Sept. 10, 1914 |
| 276,743 | Great Britain | Sept. 2, 1927 |

OTHER REFERENCES

Jacobson: "Encyclopedia of Chemical Reactions," vol. IV, pp. 427, reaction IV, 1756, 1951.